United States Patent
Gaurav et al.

(10) Patent No.: US 7,617,236 B2
(45) Date of Patent: Nov. 10, 2009

(54) METHOD AND SYSTEM FOR DISPLAYING RESULTS OF A DYNAMIC SEARCH

(75) Inventors: Vishal Gaurav, Bokaro Steel (IN); Dietmar Storz, Heidelberg (DE); Manoj Gupta, West Bengal (IN); Erik Luengen, Flein (DE)

(73) Assignee: SAP AG, Walldorf (DE)

( * ) Notice: Subject to any disclaimer, the term of this patent is extended or adjusted under 35 U.S.C. 154(b) by 260 days.

(21) Appl. No.: 11/626,864

(22) Filed: Jan. 25, 2007

(65) Prior Publication Data
US 2008/0183669 A1    Jul. 31, 2008

(51) Int. Cl.
G06F 7/00 (2006.01)
G06F 17/00 (2006.01)
G06F 17/30 (2006.01)

(52) U.S. Cl. .......................................... 707/102; 707/3
(58) Field of Classification Search ................. 707/102, 707/100, 3
See application file for complete search history.

(56) References Cited

U.S. PATENT DOCUMENTS

| | | | |
|---|---|---|---|
| 5,515,488 A * | 5/1996 | Hoppe et al. ................. 345/440 |
| 6,529,903 B2 * | 3/2003 | Smith et al. ..................... 707/7 |
| 6,772,150 B1 * | 8/2004 | Whitman et al. ............... 707/6 |
| 7,096,229 B2 | 8/2006 | Dettinger et al. |
| 7,194,692 B2 | 3/2007 | Marcos et al. |
| 2004/0034633 A1 * | 2/2004 | Rickard .......................... 707/5 |
| 2004/0254928 A1 * | 12/2004 | Vronay et al. .................. 707/5 |
| 2005/0065928 A1 * | 3/2005 | Mortensen et al. ............. 707/5 |
| 2005/0102284 A1 * | 5/2005 | Srinivasan et al. ............. 707/4 |
| 2005/0278286 A1 | 12/2005 | Djugash et al. |
| 2006/0265344 A1 * | 11/2006 | Woods .......................... 707/1 |
| 2008/0104082 A1 | 5/2008 | Gimson et al. |

* cited by examiner

Primary Examiner—Shahid A Alam
Assistant Examiner—Alexey Shmatov

(57) ABSTRACT

A method and system for displaying results of a dynamic search are provided. Results of a search are received in a result node of a query wherein the result node comprises a first node and a second node. The first node has a static key data and the second node has a dynamic key data. The static key data and the dynamic key data are transferred to a dummy node. A table displaying the static key data and the dynamic key data is then generated based upon the dummy node.

17 Claims, 7 Drawing Sheets

METHOD AND SYSTEM FOR DISPLAYING RESULTS OF A DYNAMIC SEARCH

TECHNICAL FIELD

Embodiments of the invention generally relate to computer systems, and more particularly, to a method and system for displaying results of a dynamic search.

BACKGROUND

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and the records are returned as query result.

Graphical querying interfaces have been developed that help a user to query a database by dynamically specifying search conditions. In this way, the user need not rely only upon a standard set of queries provided by an application. In addition, dynamically specifying search conditions enables the user to dynamically build queries based upon the most appropriate search conditions that may return the desired data. Due to the dynamic nature of the search conditions, the results that are returned as a result of a search need to be distributed and stored over multiple nodes of a business object. Frequently, a 1:n relation exists between records of multiple nodes and there is a need to display the records having 1:n relation in a single table to enable efficient data analysis. The existing graphical querying interfaces are unable to display records with 1:n relation in a single table. Displaying the records over multiple tables makes the data analysis a time consuming and tedious process.

SUMMARY OF THE INVENTION

Embodiments of the invention are generally directed to a method and system for displaying results of a dynamic search. Results of a search are received in a result node of a query wherein the result node comprises a first node and a second node. The first node has a static key data and the second node has a dynamic key data. The static key data and the dynamic key data are transferred to a dummy node. A table displaying the static key data and the dynamic key data is then generated based upon the dummy node.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for displaying results of a dynamic search. Results of a search are received in a result node of a query wherein the result node comprises a first node and a second node. The first node has a static key data and the second node has a dynamic key data. The static key data and the dynamic key data are transferred to a dummy node. A table displaying the static key data and the dynamic key data is then generated based upon the dummy node.

Figure 1:
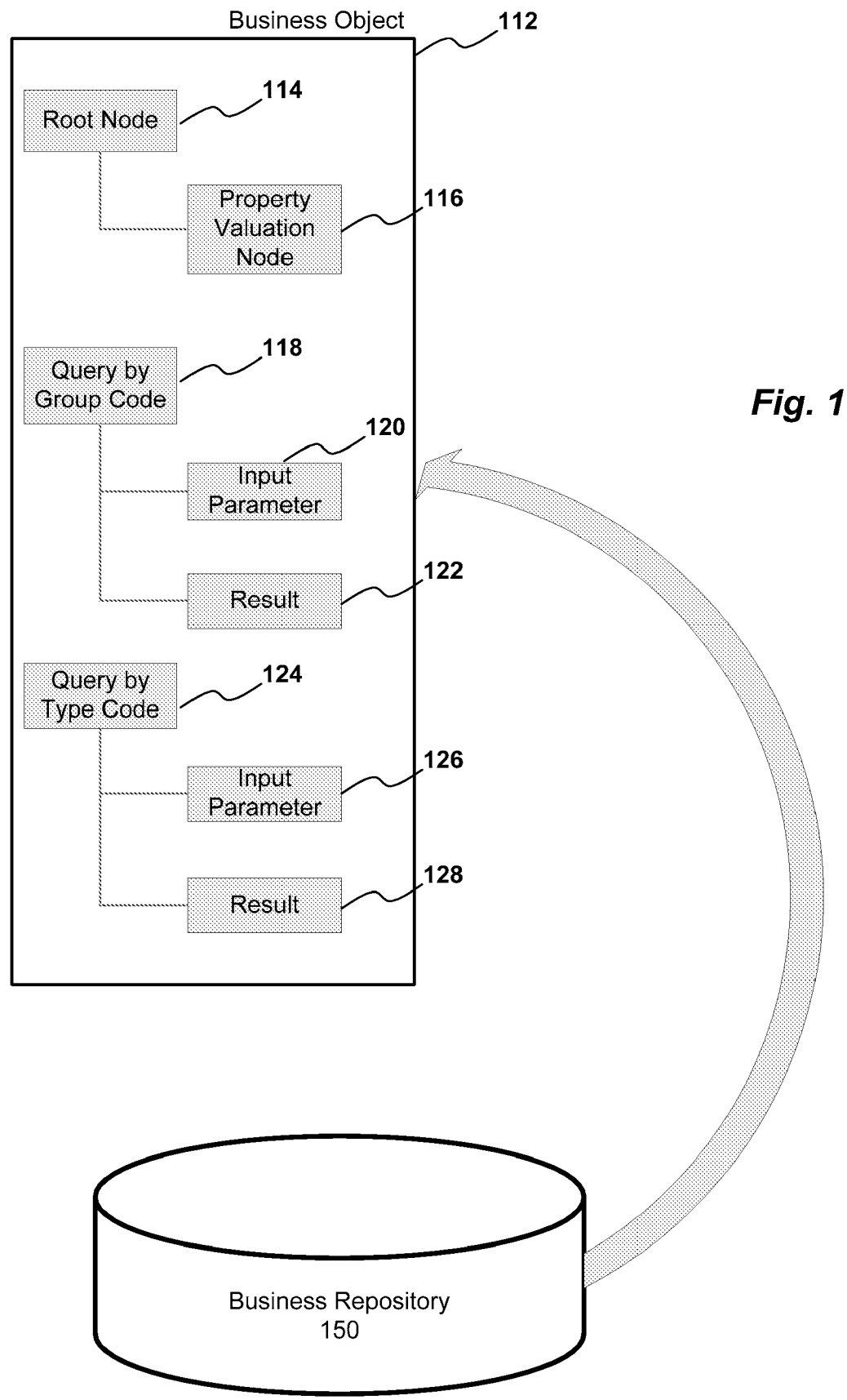
FIG. 1 is an example business object according to an embodiment of the invention.

FIG. 1 is an example business object 112 according to an embodiment of the invention. Business repository 150 typically stores business object 112. Business object 112 generally includes root node 114, query by group code (QGC) 118 and query by type code (QTC) 124. Root node 114 typically provides a structure in which querying results are stored. More particularly root node 114 provides a structure for storing querying results that are generated by executing query by group code 118 or query by type code 124. Root node 114 typically includes property valuation node 116 as an associated node. Property valuation node 116 generally provides a structure for storing results relating to dynamic fields.

Query by group code 118 typically includes input parameter node 120 and result node 122 as associated nodes. Input parameter node 120 generally provides a structure for query conditions upon which a search may be conducted. Result node 122 generally provides a structure for storing results that are generated by executing query by group code 118. In one embodiment of the invention the structure of result node 122 is same as the structure of root node 114. Query by group code 118 is typically used to retrieve metadata for one or a group of condition types.

Query by type code 124 typically includes input parameter node 126 and result node 128 as associated nodes. Input parameter node 126 generally provides a structure for storing query conditions upon which a search may be conducted. Result node 128 generally provides a structure for storing results that are generated by executing query by type code 124. In one embodiment of the invention the structure of result node 128 is same as the structure of root node 114. Query by type code 124 is typically used for searching a database based upon user defined conditions and retrieve results.

Figure 2:
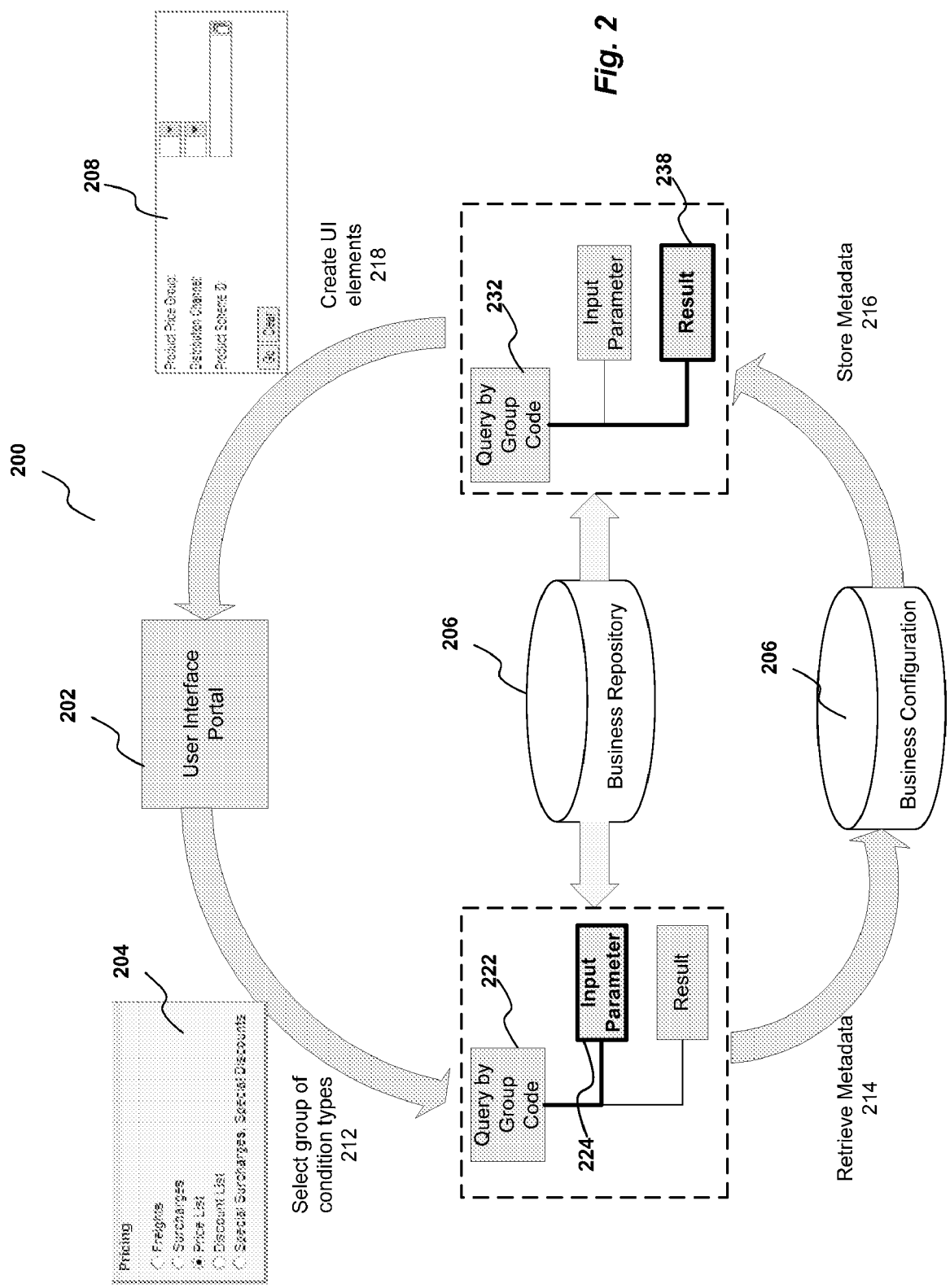
FIG. 2 is a process flow for querying a database according to an embodiment of the invention.

FIG. 2 is a process flow diagram 200 for querying a database according to an embodiment of the invention. Business configuration 206 stores a number of condition types. According to one embodiment of the invention a condition type generally includes a number of fields, each field being associated with a column of a table stored in a database. Each field of a condition type is typically a semantic key. Each condition type typically relates to a table in the database. The semantic keys of a condition type may include one or more static keys and one or more dynamic keys. The static keys are usually common across all condition types. A set of dynamic keys is typically unique for a condition type. A user may dynamically generate input fields for the dynamic keys and enter values in the input fields to specify search conditions to query a database. The user typically builds a query by specifying various logical conditions between the semantic keys of a condition type. The query is then used to search and retrieve desired results from the database. The logical conditions between the fields of a condition type may be Boolean conditions such as AND, OR, NOT, XOR or XNOR. The user may create and configure user created condition types based upon the search requirements and store the user created condition types and the corresponding tables in business configuration 206 or choose from a standard set of condition types provided by an application vendor.

According to an embodiment of the invention, user interface portal 202 enables a user to select one or more condition types including user created condition types from selectable list 204 of condition types. Each option from selectable list 204 of condition types may retrieve metadata relating to one or a group of condition types. Responsive to the user selecting one or a group of condition types 212 from selectable list 204, the user selection is passed on as input parameters to input parameter node 224 of query by group code 222. Query by group code 222 is then executed to search business configuration 206 based upon the input parameters. The metadata of the semantic keys belonging to the selected condition types is retrieved 214 as a result and stored 216 in result node 238 of query by group code 232. In one embodiment of the invention the metadata for each semantic key is stored as a separate record in result node 238. The metadata for each field of a condition type may include a user interface type, name of the field, type of field, label of field, tool tip or sync code. According to one embodiment of the invention the structure of result node 238 is same as the structure of root node 232. Thus result node 238 may have a root node and a property valuation node as an associated node. Root node of result node 238 typically stores metadata for the static keys and the property valuation node of result node 238 stores metadata for the dynamic keys. User interface elements 208 are generated 218 for all the semantic keys of the selected condition type from the retrieved metadata stored in result node 238 and displayed to the user in user interface portal 202.

Generation of user interface elements 208 typically includes dynamically creating a form having input fields for each semantic key and push buttons for performing tasks and dynamically associating the push buttons with actions. A context is typically created for session maintenance so that same data need not be retrieved repeatedly at the change of each user screen in user interface portal 202. The tasks for which push buttons are created include clearing the fields, saving a query, deleting a query, modifying a query and initiating a search based upon the values of the semantic keys. The push buttons may be associated with actions such as mouse click or press of a button on a key board. A user may enter values in each of the created input fields to build up a query and search the database to retrieve the desired results.

Query by group code 222, 232 may either be used directly from business repository 206 or an instance of query by group code 222, 232 may be created and maintained in the context. The instance of query by group code 222, 232 may then be used for querying and result retrieval purposes. A separate instance of query by group code 222, 232 may be generated every time the user selects one or a group of condition types from selectable list 204. Alternatively, a single instance of query by group code 222, 232 may be maintained in the context and reused for multiple user selections.

Figure 3:
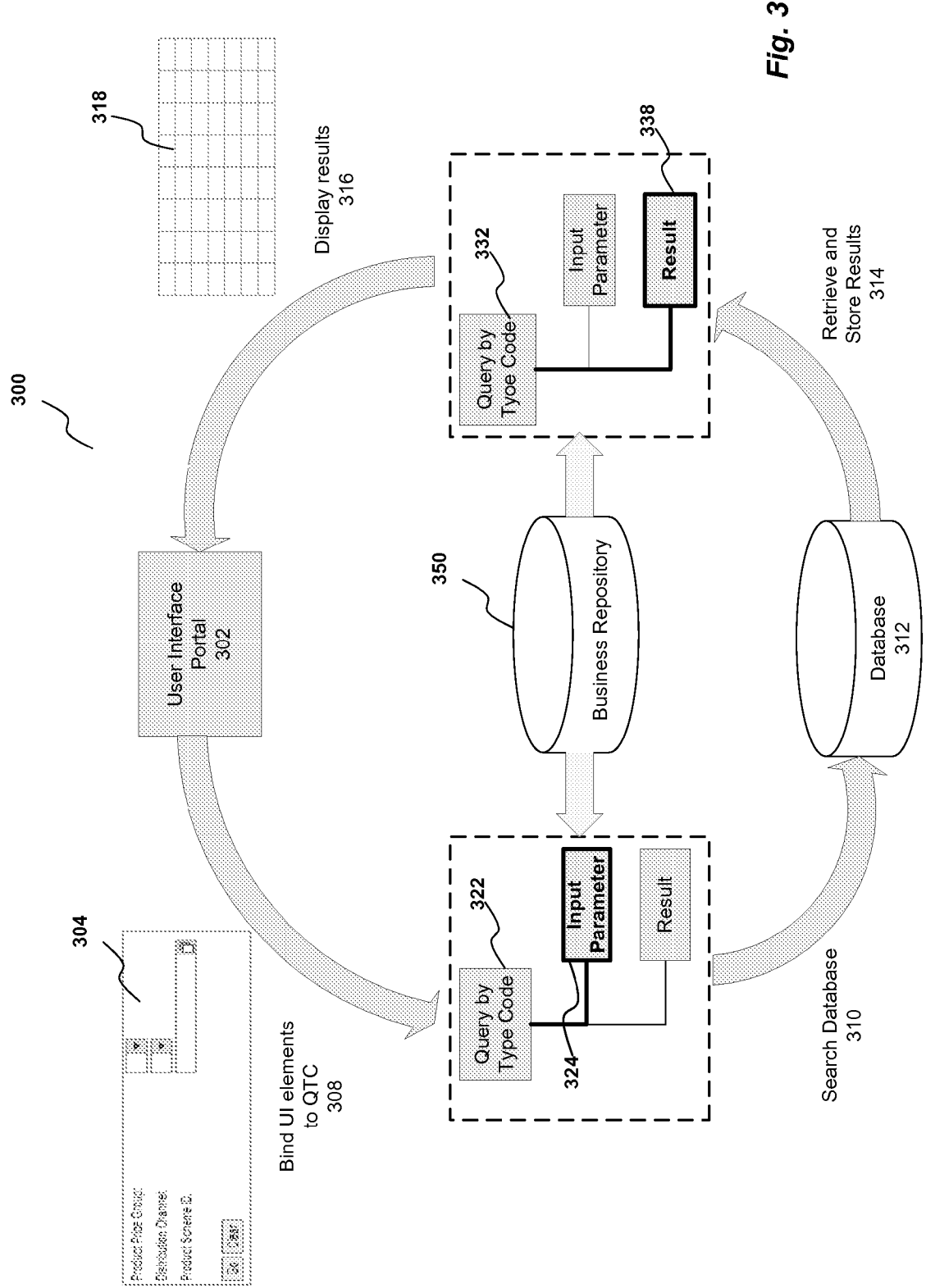
FIG. 3 is a process flow for querying a database according to an embodiment of the invention.

FIG. 3 is a process flow diagram 300 for querying a database according to an embodiment of the invention. As already indicated in the previous section, user interface elements 304 are generated for all the semantic keys of the selected condition type from the retrieved metadata stored in result node 112 of query by group code 118 and displayed to the user in user interface portal 302. The semantic keys and the corresponding values of each semantic key as entered by a user in the input fields are passed on 308 as input parameters to input parameter node 324 of query by type code 322. Query by type code 322 is then executed to initiate a search 310 in database 312 based upon the input parameters. Search results are retrieved 314 from database 312 and stored in result node 338 of query by type code 332. The retrieved results are then processed and displayed 316 to the user in required format 318 through user interface portal.

Query by type code 322, 332 may either be used directly from business repository 350 or an instance of query by type code 322, 332 may be created and maintained in the context. The instance of query by type code 322, 332 may then be used for querying and result retrieval purposes. A separate instance of query by type code 322, 332 may be generated every time the user selects one or group of condition types from the selectable list. Alternatively, a single instance of query by type code 322, 332 may be maintained in the context and reused for multiple user selections.

Figure 4:
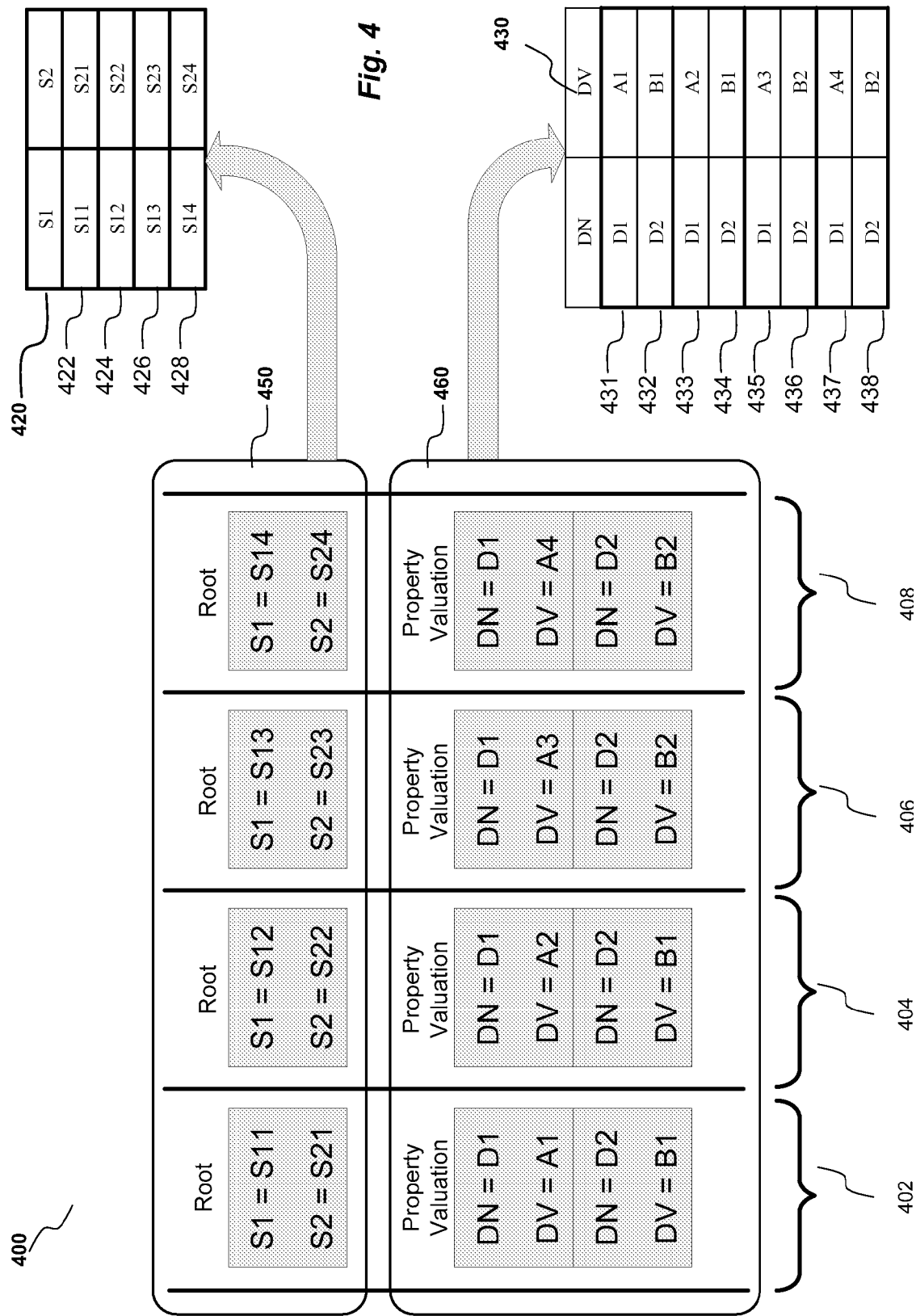
FIG. 4 illustrates the results of a database search as stored in the result node of query by type code according to an embodiment of the invention.

FIG. 4 illustrates the results 400 of a database search as stored in the result node of query by type code according to an embodiment of the invention. The structure of result node is typically same as the structure of root node of business object. Thus result node includes root node 450 and property valuation node 460 as an associated node. Root node 450 typically stores results retrieved for static keys and the property valuation node 460 stores results retrieved for the dynamic keys. Root node 450 typically represents each static key data with one attribute and property valuation node 460 represents each dynamic key data with an attribute pair. As the set of dynamic keys for each condition type is unique, each dynamic key data is represented by the attribute pair typically including a dynamic key name attribute (DN) and a dynamic key value attribute (DV). This provides a generic nature to query by type code by enabling the result node to store search results having any number of dynamic keys. Since the static keys are common across all condition types, there is no need for a static key name attribute. Thus each static key data is represented by a static key value attribute only.

According to an embodiment of the invention, property valuation node 460 typically includes only one attribute pair at design time. More instances of the attribute pair are generated at runtime based upon the number of dynamic keys in the retrieved result with one instance being generated for each dynamic key. If the retrieved result 400 includes more than one record, multiple instances of root node 450 and property valuation node 460 are generated with each instance representing one record in a result table. Each node typically represents a separate table. Thus root node 450 and property valuation node 460 represent separate tables. Each attribute in root node 450 represents a column of a semantic key and each instance of root node represents a record of the semantic key with each attribute value representing a semantic key field. Each attribute pair represents a record of a dynamic key. For example, retrieved result 400 includes four instances of root node 450 and property valuation node 460 with two attributes in each instance of root node 450 and two attribute pairs in each instance of property valuation node 450. This means that the retrieved result 400 includes two static keys namely S1 and S2, two dynamic keys namely D1 and D2, and four records for each static and dynamic key. Table 420 is a static key table as represented by root node 450. Each instance of root node 450 represents a record in table 420. Instance 402 of root node 450 represents record 422 of table 420. Similarly, instance 404, 406 and 404 of root node 450 represent records 424, 426 and 428 or table 420 respectively. Each attribute, S1 or S2, in root node 450 represents a column in table 420. For example S1 and S2 represent columns in table 420. Each attribute value represents a static key field in table 420. For example S11 represents the first static key field in record 422 and S21 represents the second static key field in record 422. Table 430 is a dynamic key table as represented by property valuation node 460. Each attribute pair represents a record in table 430. For example, attribute pairs in instance 402 of property valuation node 460 represent records 431 and 431. It may be observed from tables 420 and 430 that each static key record in table 420 is associated with two dynamic key records in table 430. In other words, each record in table 420 has a 1:2 relationship with records in table 430. For example record 422 of table 420 is associated with records 431 and 432 of table 430. For efficient analysis of retrieved result 400 there is a need to display data relating to static keys and dynamic keys in a single table. This would be enabled by representing static and dynamic keys by a single node and by representing each dynamic key data by a single attribute instead of an attribute pair.

Figure 5:
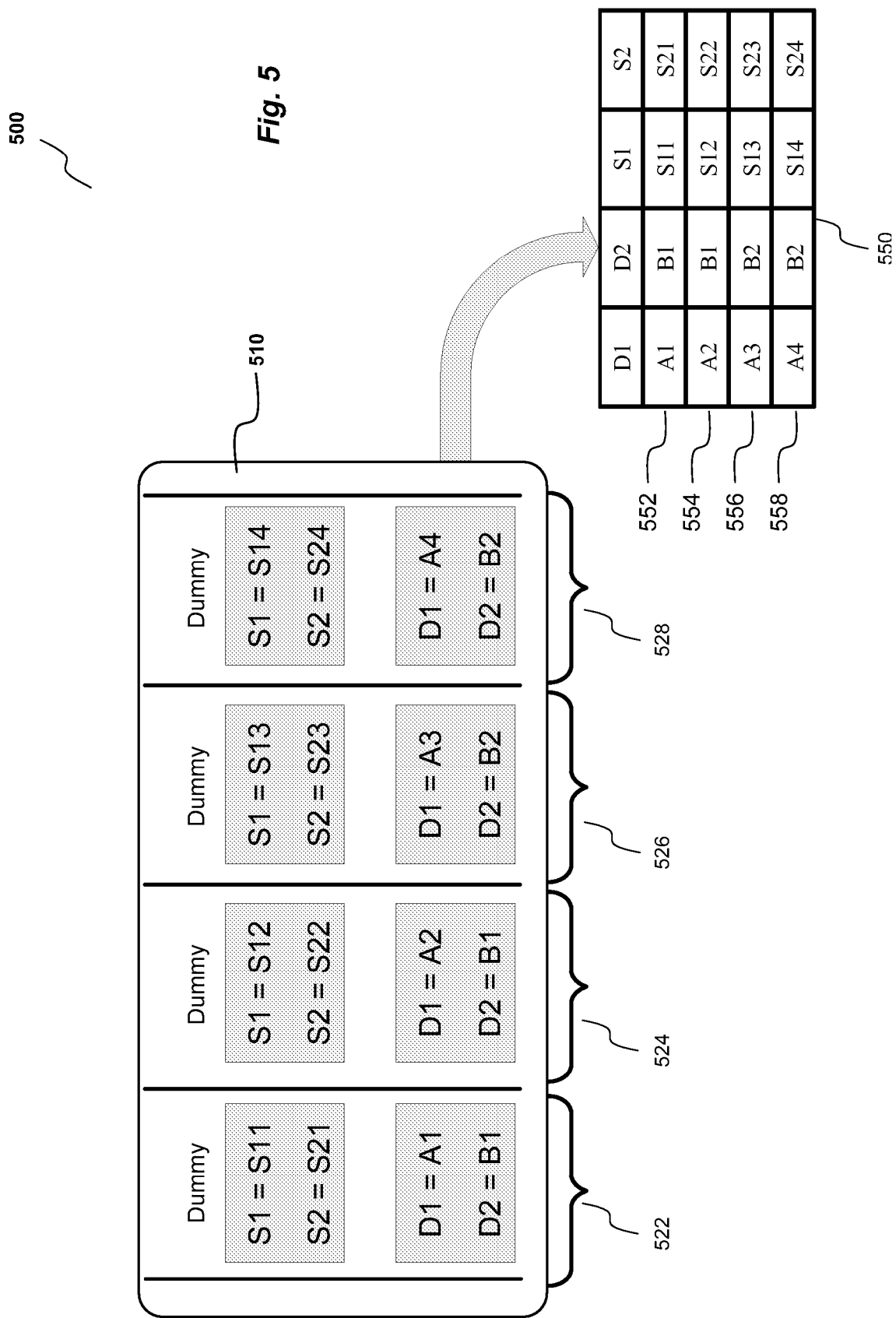
FIG. 5 illustrates the results of a database search as stored in a dummy node according to an embodiment of the invention.

FIG. 5 illustrates the results of a database search as stored in a dummy node according to an embodiment of the invention. A dummy node 510 is generated and the retrieved results 400 are transferred from root node 450 and property valuation node 460 to dummy node 510. Static key data is represented under dummy node 510 exactly same as it is represented under root node 450. As the number and names of the dynamic keys are now known, each dynamic key data is represented by a single attribute. For example "D1=A1" represents a dynamic key data. Each instance of dummy node represents a record in the result table 550. For example instance 522 represents record 552 of result table 550. Similarly instances 524, 526 and 528 represent records 554, 556 and 558 of result table 550 respectively. The result table is then displayed to the user through user interface portal 202.

Figure 6:
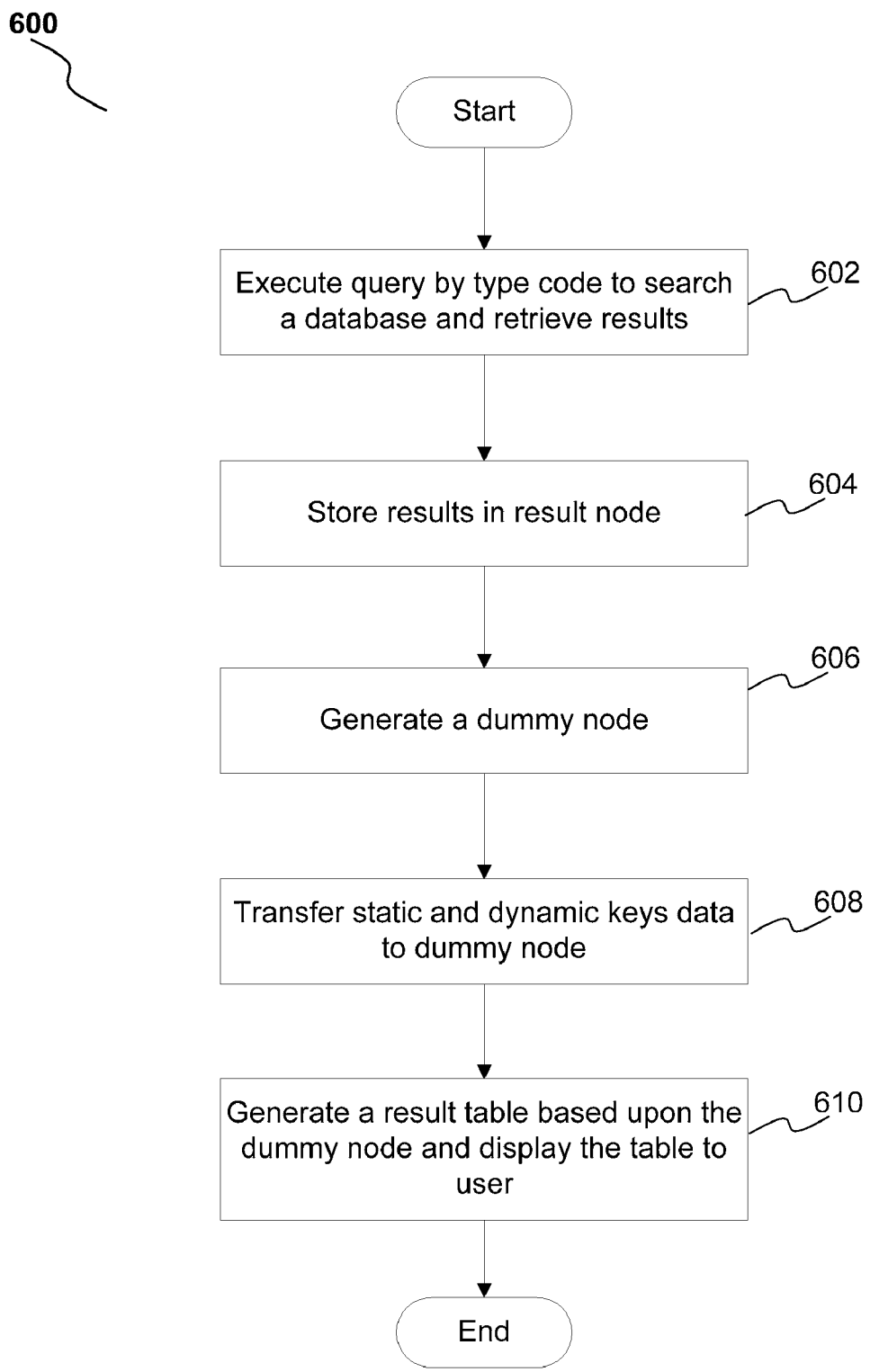
FIG. 6 is a flow diagram of a process for displaying results of a dynamic search according to an embodiment of the invention.

FIG. 6 is a flow diagram of a process 600 for displaying results of a dynamic search according to an embodiment of the invention. In process block 602, a query by type code is executed to perform a search in a database and retrieve results. In process block 604, the results retrieved as a result of the database search are stored in a result node of the query by type code. The structure of the result node is typically same as the structure of a root node of a business object. Thus the result node includes a root node and a property valuation node as an associated node. The root node of result node typically stores results retrieved for static keys and the property valuation node of the result node stores results retrieved for the dynamic keys. Process 600 then moves to process block 606 wherein a dummy node is generated. In process block 608, the static keys data from the root node and dynamic keys data from the property valuation node is transferred to the dummy node. In process block 610, a result table is generated based upon the dummy node and displayed to the user.

Figure 7:
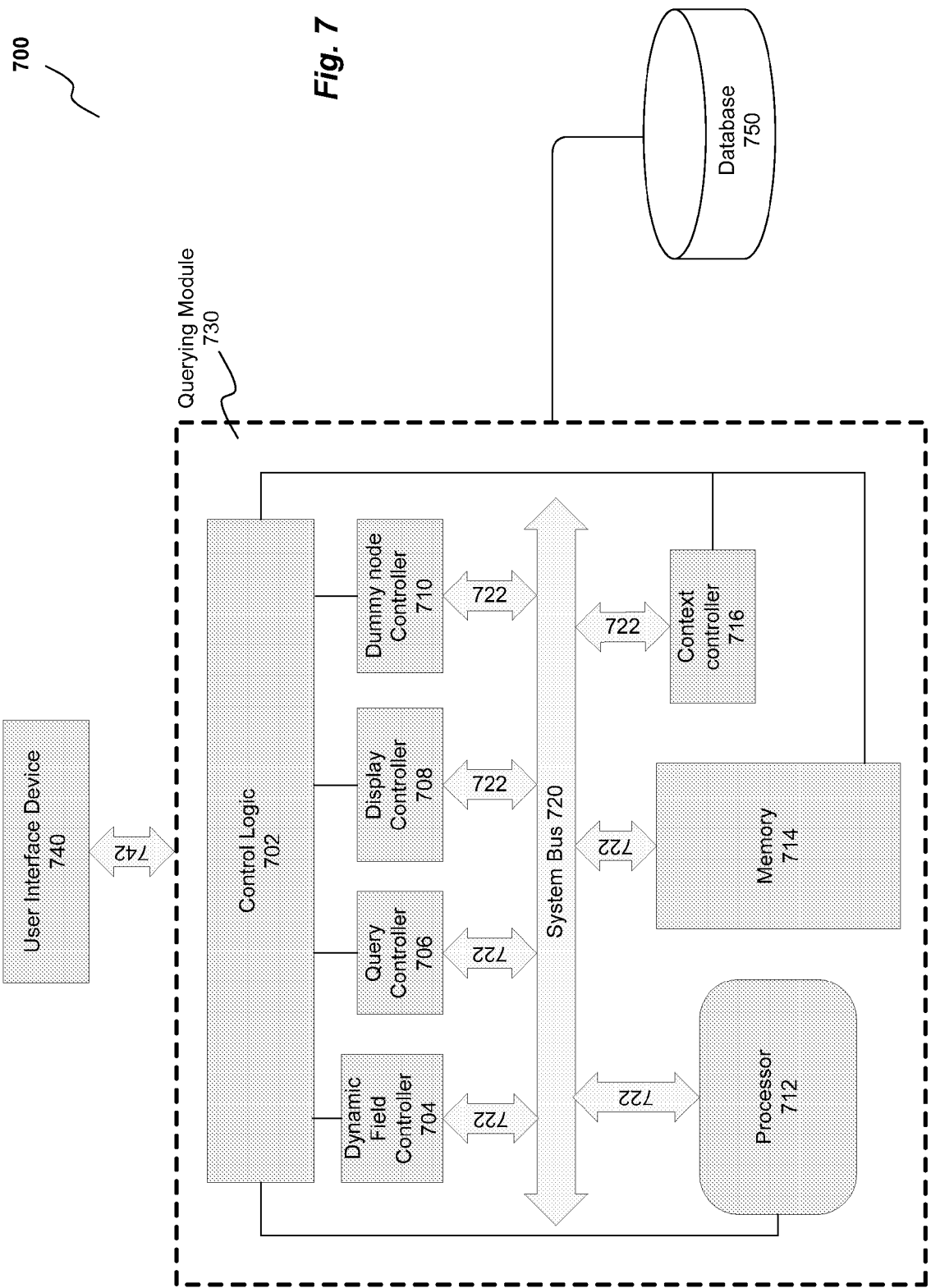
FIG. 7 is a block diagram of a system useful for implementing the invention according to an embodiment of the invention.

FIG. 7 is a block diagram of a system 700 useful for implementing the invention according to an embodiment of the invention. Querying module 730 is connected to a user interface device 740 through bus 742. The user interface device may be used by a user to select one or more condition types and to enter values in the input fields meant for static and dynamic keys to specify the search conditions. Querying module 730 carries out the search in database 750 and displays the results of the search in user interface device 740. Querying module 730 includes Dynamic field controller 704, query controller 706, display controller 708, dummy node controller 710, context controller 716, processor 712, memory 714 and control logic 702 all connected to system bus 720 through busses 722. A business repository having business object structure 112 and a business configuration having a number of condition types are typically stored in memory 714. User interface device 740 enables a user to select one or more condition types including user created condition types from a selectable list of condition types. Responsive to the user selecting one or a group of condition types from the selectable list, an instance of the query by group code is created by dynamic field controller 704 and stored in memory 714. Dynamic field controller 704 passes the user selection as input parameters to the input parameter node of the query by group code. Query by group code is then executed by dynamic field controller 704 to search the business configuration based upon the input parameters. Dynamic field controller 704 retrieves the metadata of the semantic keys as a result and stores the result in memory 714. User interface elements are generated by display controller 708 for all the semantic keys of the selected condition type from the retrieved metadata and displayed to the user through user interface device 740. A context is typically created by context controller 716 and stored in memory 714 for session maintenance.

Query controller 706 creates an instance of the query by type code from business repository and stores in memory 714. Query controller 706 receives the semantic key values and passes the semantic key values to the input parameter node of the query by type code as input parameters. Query controller 706 then executes the query by type code to initiate a search in database 750 based upon the input parameters. Search results are retrieved from database 750 and stored in the result node.

The structure of the result node is typically same as the structure of the root node of business object. Thus the result node includes the root node and the property valuation node as an associated node. The root node 450 of the result node typically stores results retrieved for static keys and the property valuation node of the result node stores results retrieved for the dynamic keys.

Dummy node controller 708 generates a dummy node and stores the dummy node in memory 714. Dummy node controller then transfers the retrieved results from the root node and the property valuation node to the dummy node. Display controller 710 then generates a result table based upon the dummy node with the result table having both static key data and dynamic key data. The result table is displayed to the user through the user interface device 740.

According to an embodiment of the invention system 700 runs on a processor 712. According to another embodiment of the invention control logic 702 provides timing and control signals all components of system 700.

The particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DYD ROMs, RAMs, EPROMs, LEPROMs, magnetic or optical cards, other type of machine-readable media suitable for storing electronic instructions. The invention may be downloaded as a computer program which may be transferred from a remote computer (e.g., a server) to a requesting computer (e.g., a client) by way of a communication link (e.g., a modem or network connection).

What is claimed is:

1. A computer implemented method for rendering a search result of a query on a user interface, the method comprising:
    receiving a selected condition type;
    generating a user interface element and a corresponding query by type code for querying a business object associated with the condition type, the query by type code adapted to query the business object based upon a value assigned to the user interface element, the user interface element comprising a static key and a dynamic key;
    based upon the value assigned to the user interface element, executing the query by type code to render a result in a result node, the result including at least one instance of a static attribute of the static key and at least one instance of a dynamic attribute pair of the dynamic key, the result node having
        a root node comprising the instance of the static attribute, the static attribute representing a static value field and
        a property valuation node comprising the instance of each of the dynamic attribute pair, the dynamic attribute pair representing a dynamic name field and a dynamic value field;
    transferring the instance of the static attribute of the root node and the instance of each of the dynamic attribute pair of the property valuation node to a dummy node, the dummy node adapted to
        identify the instance of the static attribute and each of the instance of the dynamic attribute pair being the instance of the dynamic name field and the instance of the dynamic value field, and
        store each of the instances as a record, the record comprising at least one of the instances of the static value field, the dynamic name field and the dynamic value field;
    rendering the record present in the dummy node as a result table on the user interface, by transforming the record stored in the dummy node to a column in the result table.

2. The computer implemented method of claim 1, wherein the property valuation node comprises a dynamic field name attribute, the dynamic field name attribute having a name of a dynamic key.

3. The computer implemented method of claim 1, wherein the property valuation node comprises a dynamic field value attribute, the dynamic field value attribute having a value of a dynamic key.

4. The computer implemented method of claim 1, wherein the instance of the static attribute and the instance of the dynamic attribute pair together comprise an instance of the dummy node.

5. The computer implemented method of claim 1, wherein transferring the instance of the static attribute of the root node and the instance of each of the dynamic attribute pair of the property valuation node to the dummy node comprises copying the instance of the static attribute of the root node and the instance of each of the dynamic attribute pair of the property valuation node to the dummy node.

6. The computer implemented method of claim 1, wherein transferring the instance of the static attribute of the root node and the instance of each of the dynamic attribute pair of the property valuation node to a dummy node comprises mapping the instance of the static attribute of the root node and the instance of each of the dynamic attribute pair of the property valuation node to the dummy node.

7. A computing device operable to render a search result of a query on a user interface, comprising:
    a query rendering user interface receiving a selection of a condition type to generate a user interface element and a corresponding query by type code for querying a business object associated with the condition type;
    a querying module executing the query by type code in a database, the query by type code adapted to query the business object based upon a value assigned to the user interface element, the user interface element comprising a static key and a dynamic key;
    a query controller rendering a result in a result node, the result node including at least one instance of a static attribute of the static key and at least one instance of a dynamic attribute pair of the dynamic key, the result node comprising a root node comprising the instance of the static attribute, the static attribute representing a static value field, and a property valuation node comprising the instance of each of the dynamic attribute pair, the dynamic attribute pair representing a dynamic name field and a dynamic value field;

a dummy node controller coupled to the query controller, the dummy node controller transferring the instance of the static attribute of the root node and the instance of each of the dynamic attribute pair of the property valuation node to a dummy node, the dummy node adapted to identify the instance of the static attribute and each of the instance of the dynamic attribute pair being the instance of the dynamic name field and the instance of the dynamic value field, and store each of the instances as a record, the record comprising at least one of the instances of the static value field, the dynamic name field and the dynamic value field; and a display controller coupled to the dummy node controller, the display controller rendering the record present in the dummy node as a result table on the user interface, by transforming the record in the dummy node to a column in the result table; and a memory coupled to the query controller, the dummy node controller and the display controller, the memory storing the result node, the dummy node and the result table.

8. The computing device of claim 7 further comprising a context controller for creating a context for maintaining a session.

9. The computing device of claim 7 further comprising a dynamic field controller for retrieving a metadata for a dynamic key in response to a user selecting a condition type.

10. The computing device of claim 7 further comprising a control logic coupled to the system for providing timing and control signals for the entire system.

11. The computing device of claim 7, wherein the user interface device displaying the result table on the user interface.

12. An article of manufacture comprising a machine-accessible medium that provides instructions that, when executed by a machine, cause the machine to perform operations comprising:

receiving a selected condition type;

generating a user interface element and a corresponding query by type code for querying a business object associated with the condition type, the query by type code adapted to query the business object based upon a value assigned to the user interface element, the user interface element comprising a static key and a dynamic key;

based upon the value assigned to the user interface element, executing the query by type code to render a result in a result node, the result including at least one instance of a static attribute of the static key and at least one instance of a dynamic attribute pair of the dynamic key, the result node having a root node comprising the instance of the static attribute, the static attribute representing a static value field and a property valuation node comprising the instance of each of the dynamic attribute pair, the dynamic attribute pair representing a dynamic name field and a dynamic value field;

transferring the instance of the static attribute of the root node and the instance of each of the dynamic attribute pair of the property valuation node to a dummy node, the dummy node adapted to identify the instance of the static attribute and each of the instance of the dynamic attribute pair being the instance of the dynamic name field and the instance of the dynamic value field, and store each of the instances as a record, the record comprising at least one of the instances of the static value field, the dynamic name field and the dynamic value field;

rendering the record present in the dummy node as a result table on the user interface, by transforming the record stored in the dummy node to a column in the result table.

13. The article of manufacture of claim 12, wherein the property valuation node comprises a dynamic field name attribute, the dynamic field name attribute having a name of a dynamic key.

14. The article of manufacture of claim 12, wherein the property valuation node comprises a dynamic field value attribute, the dynamic field value attribute having a value of a dynamic key.

15. The article of manufacture of claim 12, wherein the instance of the static attribute and the instance of the dynamic attribute pair together comprise an instance of the dummy node.

16. The article of manufacture of claim 12, wherein transferring the instance of the static attribute of the root node and the instance of each of the dynamic attribute pair of the property valuation node to the dummy node comprises copying the instance of the static attribute of the root node and the instance of each of the dynamic attribute pair of the property valuation node to the dummy node.

17. The article of manufacture of claim 12, wherein transferring the instance of the static attribute of the root node and the instance of each of the dynamic attribute pair of the property valuation node to a dummy node comprises mapping the instance of the static attribute of the root node and the instance of each of the dynamic attribute pair of the property valuation node to the dummy node.

* * * * *